United States Patent
Dinh et al.

(10) Patent No.: US 7,495,170 B2
(45) Date of Patent: Feb. 24, 2009

(54) ADJUSTABLE DEVICE COVER

(75) Inventors: Cong Thanh Dinh, Collierville, TN (US); Andrew Christopher Cole, Memphis, TN (US); James Munro Sanders, Southaven, MS (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/717,383

(22) Filed: Mar. 13, 2007

(65) Prior Publication Data

US 2007/0290584 A1   Dec. 20, 2007

Related U.S. Application Data

(60) Provisional application No. 60/814,138, filed on Jun. 16, 2006, provisional application No. 60/873,340, filed on Dec. 7, 2006.

(51) Int. Cl.
*H01H 9/02* (2006.01)
(52) U.S. Cl. ............... 174/58; 174/50; 174/53; 174/66; 174/67; 174/135; 220/241; 33/528
(58) Field of Classification Search .......... 174/58, 174/66, 67, 50, 53, 135; 220/241, 242, 3.2–3.9; 33/528; 248/906
See application file for complete search history.

(56) References Cited

U.S. PATENT DOCUMENTS

| 4,634,015 | A | 1/1987 | Taylor |
| 5,012,043 | A | 4/1991 | Seymour |
| 5,931,325 | A | 8/1999 | Filipov |
| 6,820,760 | B2 | 11/2004 | Wegner et al. |
| 6,875,922 | B1 | 4/2005 | Petak et al. |
| 7,301,009 | B2 * | 11/2007 | Korcz .................. 174/58 |

\* cited by examiner

*Primary Examiner*—Dhiru R Patel
(74) *Attorney, Agent, or Firm*—Hoffmann & Baron, LLP (57) ABSTRACT

This invention pertains to an adjustable cover for an electrical outlet box. The cover is configured having a generally planar mounting plate with a collar surrounding an opening through this mounting plate. An extension sleeve moves within this opening and adjacent the collar. At least one fastener is located adjacent the opening and is movable between a locked position and an unlocked position. The fastener operates a locking device that engages and bias against the extension sleeve when the fastener is in the locked position and which disengage and cease biasing the extension sleeve when the fastener is in the unlocked position.

22 Claims, 6 Drawing Sheets

ADJUSTABLE DEVICE COVER

CROSS-REFERENCE TO RELATED APPLICATION

This application claims priority to U.S. Provisional Patent Application No. 60/814,138 filed on Jun. 16, 2006, and U.S. Provisional Patent Application No. 60/873,340 filed on Dec. 7, 2006, all of which are incorporated herein by reference.

FIELD OF THE INVENTION

This invention pertains to a cover of an electrical outlet box and more particularly to a cover having an adjustable extension sleeve attached thereto.

BACKGROUND OF THE INVENTION

During construction, electrical outlet boxes are affixed to their support or stud prior to the wall covering (i.e. dry wall) being installed. It is generally known what thickness of dry wall is going to be installed and hence electrical outlet boxes are installed off-set from the front of the stud by that amount so as to be flush with the wall. However, if the dry wall thickness is not known or if it changes or if additional wall material (i.e. tile, sound insulation, double-layer dry wall) is subsequently added, then the box opening will no longer be flush with the wall and hence it will be difficult, if not impossible, to properly install an electrical device within the box.

Solutions to this problem are varied. U.S. Pat. No. 5,253,831 discloses a bracket that is rigidly affixed to the stud. A box is then adjustably secured to the bracket. Thus, if the wall material is greater or less than expected, the entire box can be adjusted accordingly. Unfortunately, if the code specifies that all wiring to/from the box be contained in conduit, this would mean that the conduit would also have to move along with the box which is not always possible.

U.S. Pat. No. 4,927,039 discloses a removable attachment that abuts the open perimeter of the box. A first (cut-out) wall covering is applied over the box before the attachment is secured against the open front face of the box. Then a second wall covering is installed. Thus, this attachment is configured to accommodate both wall thicknesses, but such thicknesses must be known beforehand so that the proper sized attachment can be ordered. If there is any subsequent change, this attachment cannot be subsequently altered.

A further variation is shown in U.S. Pat. No. 2,378,861 and U.S. Pat. No. 4,634,015. In both of these cases, an extension sleeve is mounted to either the box itself or to the box's cover. The extension sleeve is threadably mounted such that it can be adjusted as needed even after the wall material is installed. In both cases, however, the user must make the adjustments from inside the box which exposes the installer to the oftentimes live wires contained therein. Also, in both cases, long screws are needed as they must be at least as long as the adjustment range of the extension sleeve. Such screws also project well into the box and can interfere with the box's wiring. Further, in both cases, the ground path from the electric device to the box passes through the screw; hence if the screw is loose or the mating threads are not properly sized, grounding issues can surface. Finally, in both cases, the screw is used to position the extension sleeve and hence the extension sleeve can never be rigidly locked into any one position.

It is thus an object of this invention to provide a cover that is inexpensive to manufacture and yet is infinitely adjustable. A further object of this invention is to provide a cover whose adjustable extension sleeve provides a solid ground path for the electric device and which can be easily locked or fixed at a selected position as desired. Still a further object of this invention is to eliminate the need for long screws that can interfere with the box's wiring and to also eliminate the need for the installer to make adjustments from within the box. Yet another object of this invention is to provide a means where adjustments to the box can be made without adjusting the position of the box itself. It is a further object of this invention to provide a means of making adjustments even if the wall thickness varies or if later a new wall covering is applied. These and other objects and advantages of this invention will be come apparent upon further investigation and review.

SUMMARY OF THE INVENTION

This invention pertains to an adjustable cover that is mounted to an electrical outlet box. The cover incorporates a mounting plate that extends over a portion of the electrical outlet box. This cover includes a collar that surrounds an opening with this collar having a distal end spaced from the mounting plate. An extension sleeve fits within this collar and moves with respect thereto. Adjacent the opening is at least one fastener, this fastener being movable between a locking position and an unlocking position. The fastener operates a locking device to selectively cause such device to engage or disengage the extension sleeve in order to selectively lock or unlock the extension sleeve with respect to the mounting plate.

The adjustable cover for an electrical outlet box of the present invention includes a mounting plate, an extension sleeve, at least one fastener, and a locking device. The mounting plate has a collar surrounding an opening. The collar has a distal end region remote from the mounting plate. The extension sleeve is sized to move within the opening adjacent the distal end of the collar. The fastener is secured adjacent the opening and movable between a locking and an unlocking position. The a locking device is operable by the fastener, and the locking device is configured to selectively engage and disengage the extension sleeve so as to selectively lock and unlock the extension sleeve with respect to the mounting plate.

The present invention includes an adjustable cover for an electrical outlet box including a mounting plate having a collar. The collar has an inner rim and a planar portion extending from the inner rim. An extension sleeve extends adjacent to the inner rim and perpendicular to the mounting plate. The extension sleeve freely moves perpendicularly within the inner rim and includes at least one stop extending from both edges of the extension sleeve to prevent the extension sleeve from sliding out from the mounting sleeve. At least one fastener is secured between the extension sleeve and the inner rim and movable between a locking position and an unlocking position. A locking device is operable by the fastener. The locking device is configured to selectively engage and disengage the extension sleeve so as to selectively lock and unlock the extension sleeve with respect to the mounting plate.

DETAILED DESCRIPTION OF THE PREFERRED EMBODIMENT

Figure 1:
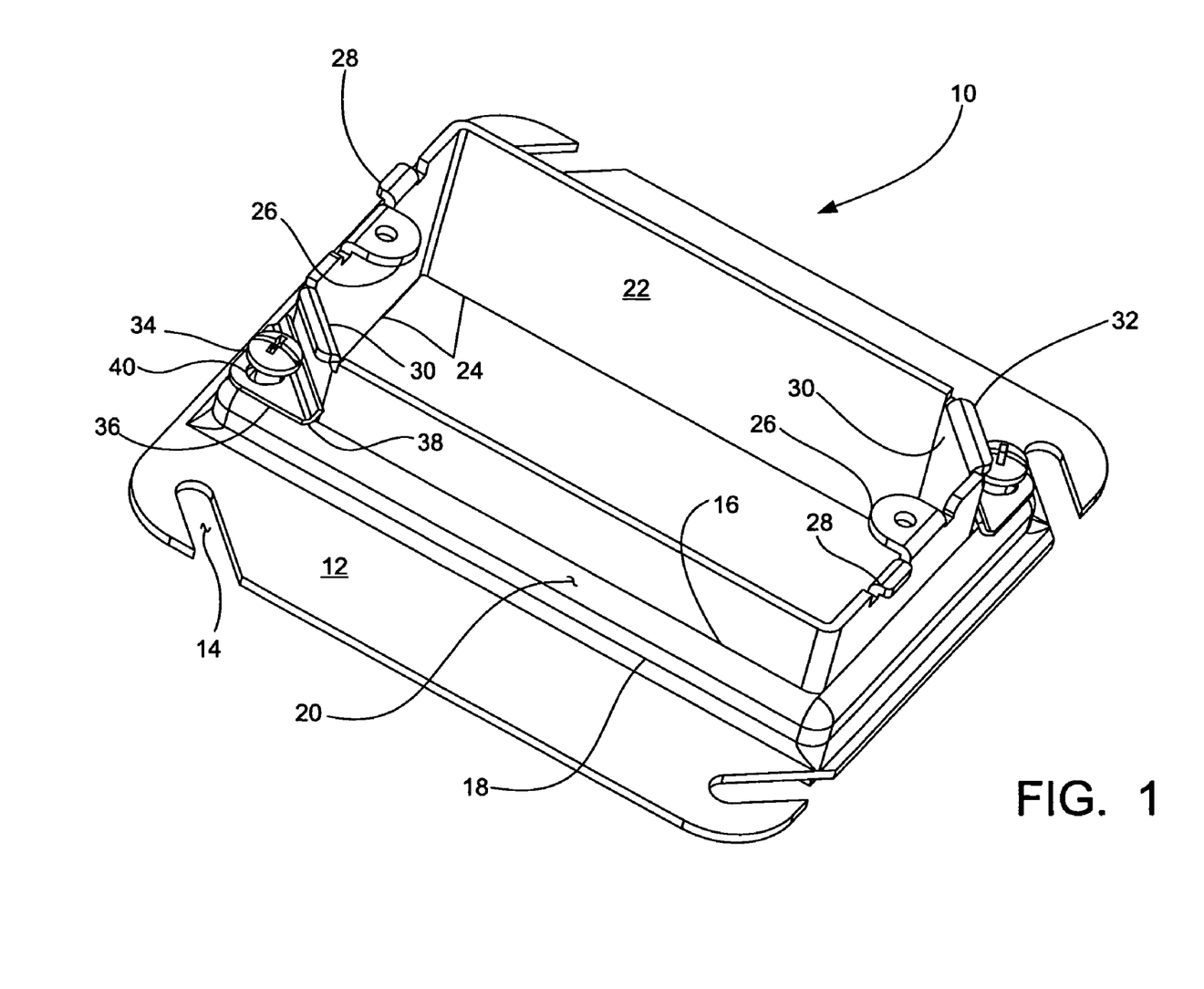
FIG. 1 is a top perspective view of the present invention.
Figure 2:
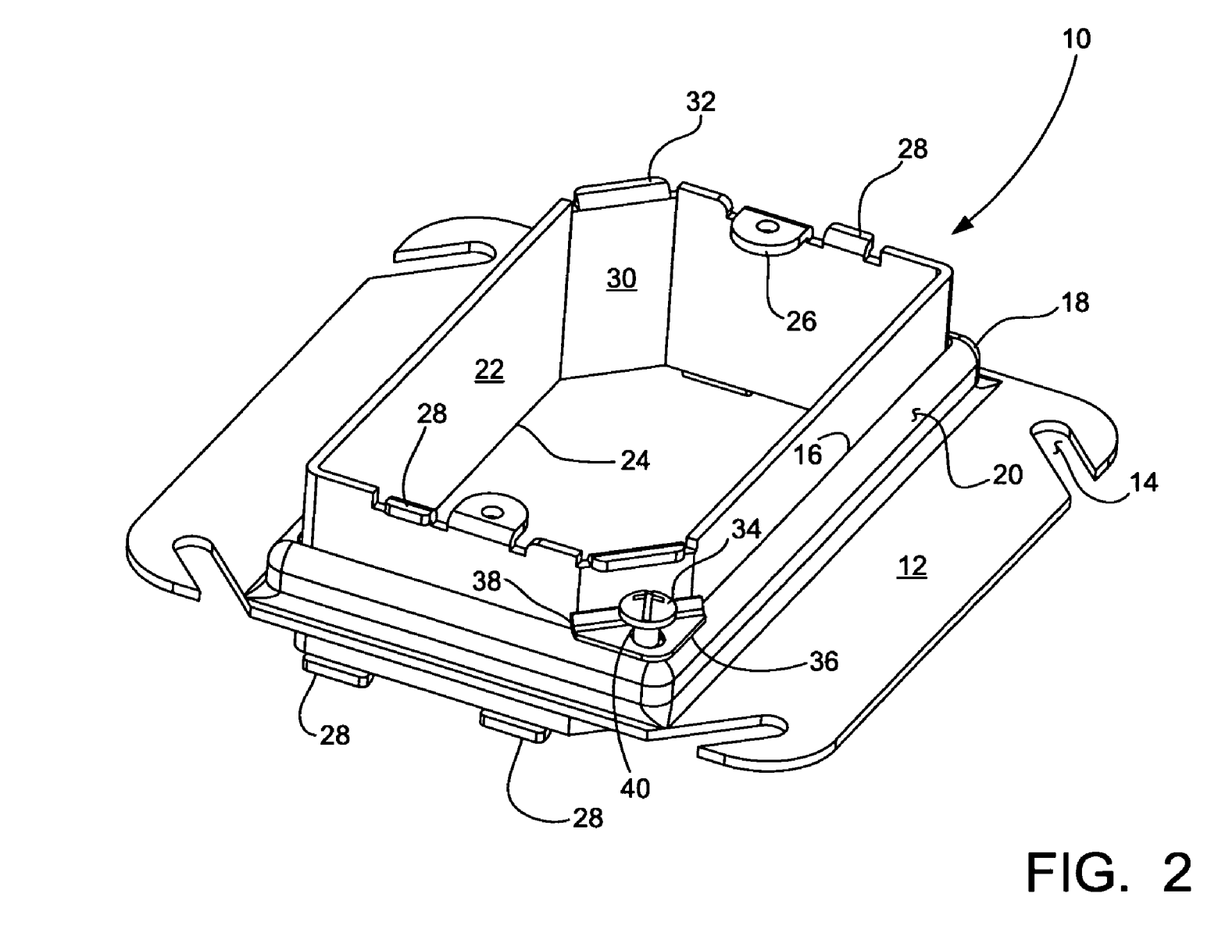
FIG. 2 is a bottom perspective view of FIG. 1.
Figure 3:
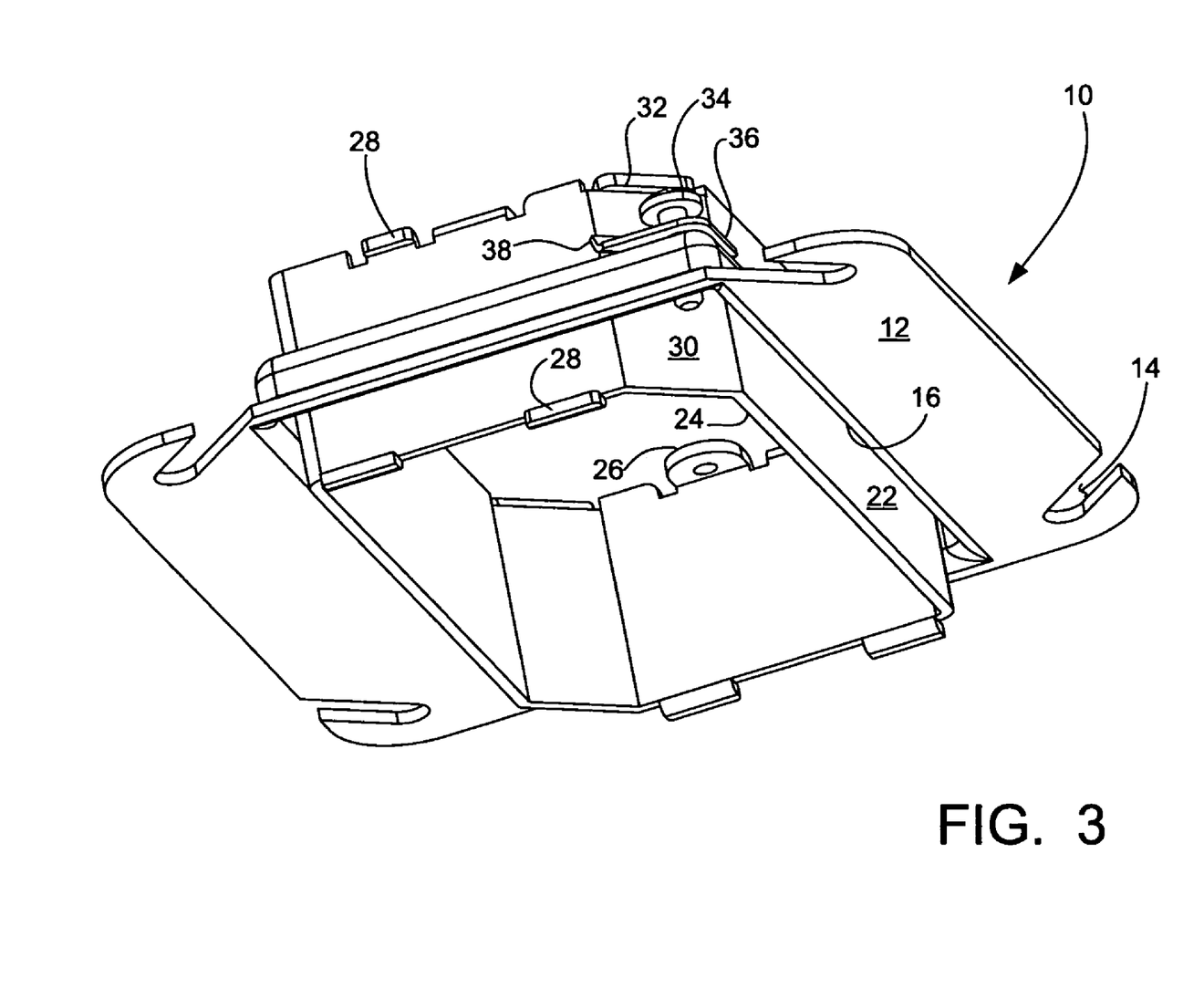
FIG. 3 is a top perspective view of FIG. 1 partially disassembled.

Referring to FIGS. 1-3, there is shown one embodiment of adjustable device cover 10. This assembly includes a generally rectangular base or mounting plate 12 that is used to secure device cover 10 to an electrical outlet box (not shown). A series of slots or apertures 14 are spaced along the perimeter of plate 12 through which one or more fasteners would extend so as to mount cover 10 to the outlet box in the convention fashion. These slots 14 are preferably arranged so that mounting plate 12 can be secured to the box in a variety of different orientations.

The center of cover 10 contains a large opening 16 that permits access through cover 10 to the interior of the electrical outlet box. Surrounding and perhaps defining opening 16 is collar 18 which projects away from and generally perpendicular to mounting plate 12. The upper distal end 20 of collar 18 is generally rounded, being curved towards opening 16.

Slidably positioned within collar 18 and oftentimes abutting distal end 20 is extension sleeve 22. Extension sleeve 22 is generally an open box-like structure having sidewalls 24 corresponding with opening 16. The depth of sidewalls 24 is approximately the amount of adjustment provided by cover 10, hence such depth can be varied by the manufacturer as needed. Extension sleeve 22 contains device mounting tabs 26 which are used to secure an electric device (not shown) to cover 10. Also, if desired, extension sleeve 22 can be configured with upper and lower stops 28 that prevent extension sleeve 22 from sliding out of mounting plate 12. Such stops 28 can consist primarily of small projections that engage distal end 20 but cannot pass through opening 16.

The opposite corners 30 of extension sleeve 22 are beveled. While this bevel is shown as being flat, other configurations are possible if desired. It is also possible that the four corners 30 of extension sleeve 22 are regular 90 degree corners. In some cases, protruding stops 32 are located at one or more such corners 30 which help prevent extension sleeve 22 from sliding out of collar 18. However, these stops 32 are not required for the operation of cover 10.

As shown, just outside opposite corners 30 is a short fastener 34 that threads into collar 18 and, in this embodiment, the distal end 20 thereof. These fasteners 34 are adjustable between a locking position and an unlocking position. Loosely contained by fastener 34 when in the unlocked position is a locking device or wedge 36. This wedge 36 is configured with an upturned edge 38 that ideally matches the shape of its adjacent corner 30 of extension sleeve 22. Wedge 36 is shown in this embodiment as being triangular with upturned edge 38 being configured so as to engage as fully as possible the bevel of corner 30.

Wedge 36 is sized so that while it is loosely restrained by fastener 34 (such as via wedge aperture 40), extension sleeve 22 can move freely with respect to mounting plate 12. However, once extension sleeve 22 is positioned where desired, the subsequent tightening of fastener 34 will force upturned edge 38 against beveled corner 30. Such force as applied by wedge 36 will bind or lock extension sleeve 22 within collar 18, and especially when multiple such fasteners 34 are tightened. Thus extension sleeve 22 will be locked in place within cover 10 via a short fastener 34 located outside central opening 16. Further, because the surface of upturned edge 38 engages a similarly shaped (i.e. straight) surface on beveled corner 30, there is much greater contact between mounting plate 12 and extension sleeve 22. This provides for a more reliable ground connection between the two.

Figure 4:
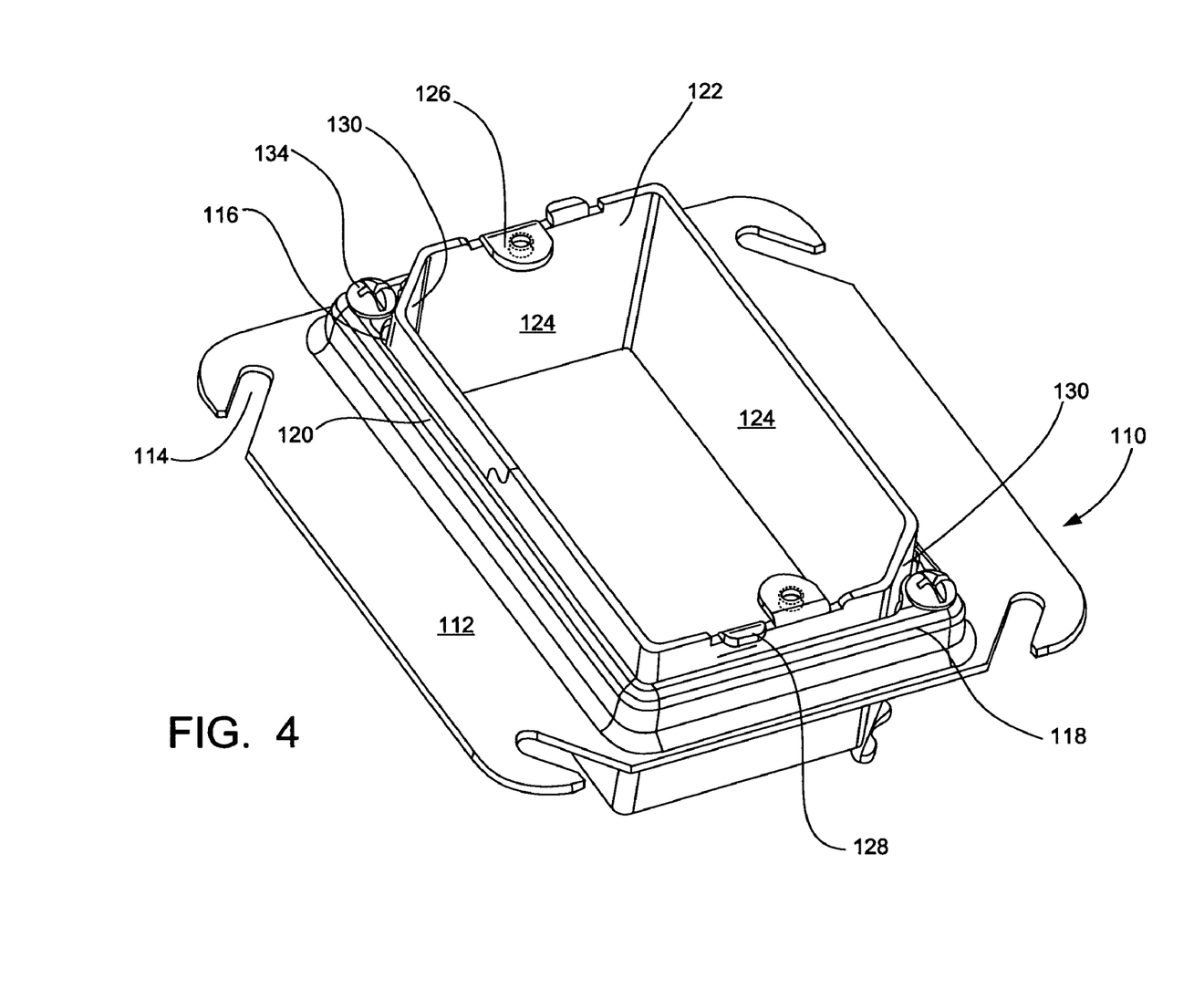
FIG. 4 is a top perspective view of another embodiment of the present invention.
Figure 5:
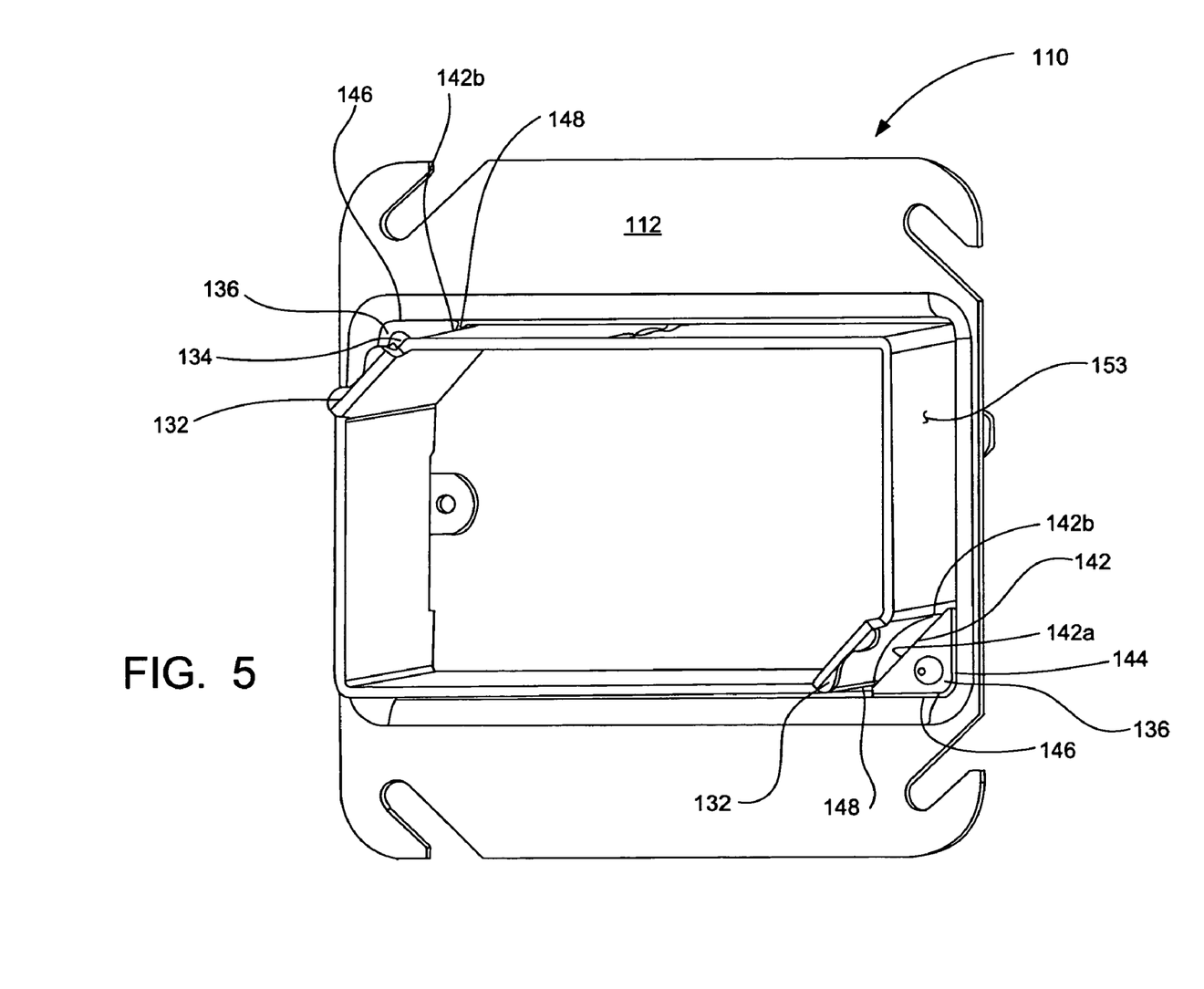
FIG. 5 is a bottom perspective view of the embodiment of FIG. 4.
Figure 6:
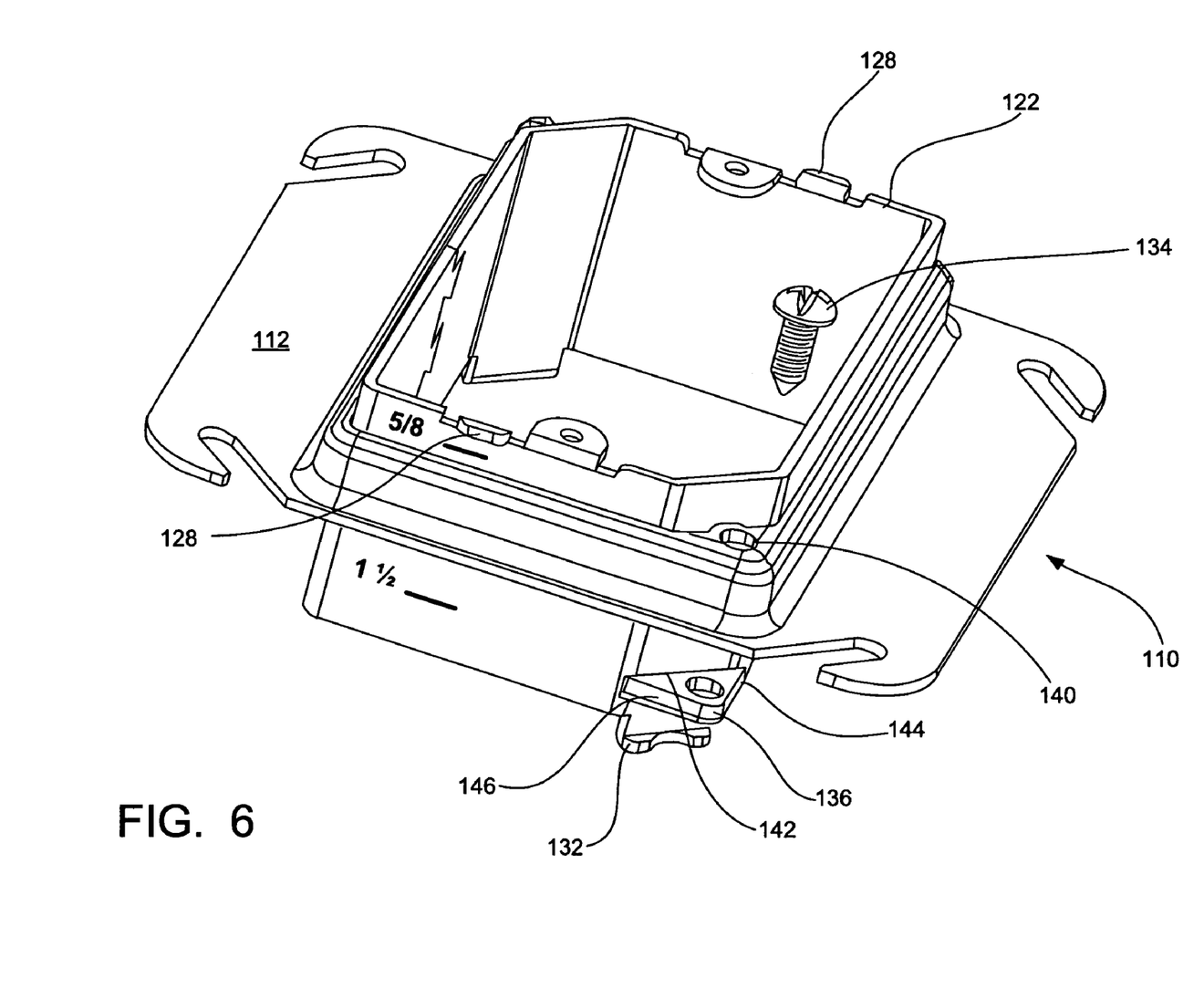
FIG. 6 is a top perspective view of the embodiment of FIG. 4 partially disassembled.

Another embodiment is shown in FIGS. 4-6, there is shown an adjustable device cover 110. This assembly includes a generally rectangular base or mounting plate 112 that is used to secure device cover 110 to an electrical outlet box (not shown). A series of slots or apertures 114 are spaced along the perimeter of plate 112 through which one or more fasteners would extend so as to mount cover 110 to the outlet box in the conventional fashion. These slots 114 are preferably arranged so that mounting plate 112 can be secured to the box in a variety of different orientations.

The center of cover 110 contains a large opening 116 that permits access through cover 110 to the interior of the electrical outlet box. Surrounding and perhaps defining opening 116 is collar 118 which projects away from and generally perpendicular to mounting plate 112. The upper distal end, or inner rim, 120 of collar 118 is generally rounded, being curved towards opening 116. Up to this point, cover 110 is similar to a typical mud or dry-wall ring.

Slidably positioned within collar 118 and oftentimes abutting distal end 120 is extension sleeve 122. Extension sleeve 122 is generally an open box-like structure having sidewalls 124 corresponding with opening 116. The depth of sidewalls 124 is approximately the amount of adjustment provided by cover 110; hence such depth can be varied as needed. Extension sleeve 122 contains device mounting tabs 126 which are used to secure an electric device (not shown) to cover 110. Also, if desired, extension sleeve 122 can be configured with stops 128 that prevent extension sleeve 122 from sliding out of mounting plate 112. Such stops 128 can consist primarily of small projections that engage distal end 120 but cannot pass through opening 116. Each corner of the extension sleeve 122 is roughened which provides for frictional engagement between the extension sleeve 122, and locking device, or wedge 136, and/or mounting plate 112.

In the preferred embodiment, two opposite corners 130 of extension sleeve 122 are beveled. While this bevel is shown as being flat, other configurations are possible if desired. Protruding stops 132 are located along extension sleeve 122 which also help prevent extension sleeve 122 from sliding out of collar 118. As shown in FIGS. 4-6 protruding stops 132 extend from the bottom edge of the extension sleeve 122. The stops 132 can be located anywhere along the length of extension sleeve 122, including flush with the bottom edge of the extension sleeve 122. As can be seen, the adjacent corners of collar 118 are configured to conform to or accommodate the shape of these corners 130 on extension sleeve 122.

As shown in FIGS. 4-6, just outside opposite corners 130 of extension sleeve 122 is a short fastener 134 that freely passes through aperture 140 in the adjacent corners of collar 118. In this embodiment, such open apertures 140 are located at the distal end 120 of collar 118. These fasteners 134 thread into wedge 136 which is adjustable between a locking position and an unlocking position.

When fastener 134 is rotated into the locking position, the threaded wedge 136 is moved along fastener 134 so as to bias tightly against corner 130 of extension sleeve 122. This is accomplished by forcing wedge 136 to ride along the inner surface of collar 118 whenever fastener 134 is rotated. Because the distal end of this inner surface bends or is curved towards extension sleeve 122, wedge 136 is thus forced in this direction and against its respective corner 130. This will lock extension sleeve 122 in place. When fastener 134 is rotated into the unlocking position, the threaded wedge 136 is moved in the opposite direction so as to be loosened or unbiased from corner 130 of extension sleeve 122 thereby allowing extension sleeve 122 to move freely.

In the present embodiment, wedge 136 is sized to abut both the beveled corner 130 of extension sleeve 122 as well as abut the underneath side of collar 118. Thus, when in the locked position, wedge 136 is rigidly biased against both extension sleeve 122 and the underside of collar 118 thereby creating an electrical ground path between the two. Fastener 134 also serves as a ground path between the two.

As indicated above, in the locked position the mounting plate 112 is sandwiched between the wedge 136 and fastener 134 and further the wedge 136 seats under and within the rounded distal end 120 of the collar 118. This positioning of the wedge 136 allows for flush mounting of mounting plate 112 without the wedge 136 interfering with the installation of the device 110. The wedge 136 is generally planar with a triangular shape to match the shape and angle of its adjacent corner 130 of extension sleeve 122 at the hypotenuse 142 of the wedge 136. The remaining sides 144 and 146 of the wedge are configured to match the shape of the underside of the distal end 120 of the collar 118 to allow for placement therein when the wedge 136 is in the locked positioned, as shown in FIG. 4. The hypotenuse 142 of wedge 136 may be slightly bowed or convexed outwardly toward the extension sleeve 122 such that the center portion 142a of the hypotenuse 142 engages with the bevel of corner 130, and the two edge portions 142b of the hypotenuse 142 are not engaged with the corner 130. Thus, there is a slight gap 148 between the edges portions 142b and the corner 130. This allows for easier repositioning of the extension sleeve 122 because less turns of the fastener 134 is required to unlock the wedge 136. The wedge 136 is able to shift about the hypotenuse 142 and use the gap 148 between the edge portions 142b and the beveled corner 130 to create enough slack to move the extension sleeve 122 with respect to collar 118.

Referring to FIG. 4, wedge 136 is sized so that while it is threadably connected to fastener 134 but spaced from extension sleeve 122 and while fastener 134 passes through open aperture 140, extension sleeve 122 can move freely with respect to mounting plate 112. However, once extension sleeve 122 is positioned where desired, the subsequent tightening of fastener 134 will force the center portion 142a of the wedge 136 against beveled corner 130 of extension sleeve 122. Such force as applied by wedge 136 will bind or lock extension sleeve 122 within collar 118, and especially when multiple such fasteners 134 are tightened. Thus extension sleeve 122 will be locked in place within cover 110 via a short fastener 134 located outside central opening 116. Further, because the hypotenuse 142 is slightly bowed outwardly toward the corner 130, there is specific contact between the center portion 142a and extension sleeve 122, thereby providing a ground path between the two. Other ground paths also arise such as where extension sleeve 122 is forced against collar 118 due to this locking action.

Further, the extension sleeve 122 may include markings 150 to identify the proper placement of the mounting plate thereabout for the specified wall thickness. Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims appended hereto.

What is claimed is:

1. An adjustable cover for an electrical outlet box comprising:

(a) a mounting plate having a collar surrounding an opening, said collar having a distal end region remote from said mounting plate;

(b) an extension sleeve sized to move within said opening adjacent said distal end of said collar;

(c) at least one fastener secured adjacent said opening and movable between a locking and an unlocking position; and (d) a locking device operable by said fastener, said locking device configured to selectively engage and disengage said extension sleeve so as to selectively lock and unlock said extension sleeve with respect to said mounting plate.

2. The adjustable cover as set forth in claim 1 wherein said fastener is secured to said collar.

3. The adjustable cover as set forth in claim 2 wherein said fastener is secured to said distal end of said collar.

4. The adjustable cover as set forth in claim 1 wherein a first said fastener and a first said locking device is located adjacent a first corner of said opening and a second said fastener and a second said locking device is located adjacent an opposite corner.

5. The adjustable cover as set forth in claim 4 wherein each of said locking device is a wedge.

6. The adjustable cover as set forth in claim 5 wherein said mounting plate is sandwiched between said wedge and a head of said first fastener.

7. The adjustable cover as set forth in claim 5 wherein said extension sleeve is configured with a mating surface for engagement thereof by said wedge.

8. The adjustable cover as set forth in claim 7 wherein said extension sleeve further comprises upper and lower stops that prevent said extension sleeve from sliding out of said collar.

9. The adjustable cover as set forth in claim 8 wherein said extension sleeve has a roughened surface to provide frictional engagement with said distal end of said collar wedge.

10. The adjustable cover as set forth in claim 5 wherein said wedge is triangular in shape.

11. The adjustable cover as set forth in claim 5 wherein said wedge is configured with a mating edge for engagement thereof with a surface of said extension sleeve.

12. The adjustable cover as set forth in claim 5 wherein said wedge includes a slightly convexed edge for engagement with a surface of said extension sleeve.

13. An adjustable cover for an electrical outlet box comprising:

(a) a mounting plate having an inner rim, said inner rim defining an opening;

(b) an extension sleeve extending adjacent to said inner rim and perpendicular to said mounting plate, said extension sleeve freely moves perpendicularly within said inner rim, said extension sleeve includes at least one stop extending from both edges of said extension sleeve to prevent said extension sleeve from sliding out of said mounting plate;

(c) at least one fastener secured between said extension sleeve and said inner rim and movable between a locking position and an unlocking position; and (d) a locking device operable by said fastener, said locking device configured to selectively engage and disengage said extension sleeve so as to selectively lock and unlock said extension sleeve with respect to said mounting plate.

14. The adjustable cover as set forth in claim 13 wherein said fastener is secured to said inner rim.

15. The adjustable cover as set forth in claim 14 wherein a first said fastener and locking device is located adjacent a first corner of said inner rim and a second said fastener and locking device is located adjacent an opposite corner.

16. The adjustable cover as set forth in claim 15 wherein each of said locking device is a wedge.

17. The adjustable cover as set forth in claim 16 wherein said mounting plate is sandwiched between said wedge and a head of said first fastener.

18. The adjustable cover as set forth in claim 17 wherein said extension sleeve is configured with a mating surface for engagement thereof by said wedge.

19. The adjustable cover as set forth in claim 18 wherein said wedge is triangular in shape.

20. The adjustable cover as set forth in claim 19 wherein said wedge is configured with a mating edge for engagement thereof with a surface of said extension sleeve.

21. The adjustable cover as set forth in claim 19 wherein said wedge includes a slightly convexed edge for engagement with a surface of said extension sleeve.

22. The adjustable cover as set forth in claim 21 wherein said extension sleeve has a roughened surface to provide frictional engagement with said inner rim and/or wedge.

* * * * *